(12) United States Patent
Anstandig et al.

(10) Patent No.: US 9,294,210 B2
(45) Date of Patent: Mar. 22, 2016

(54) SYSTEM FOR PROVIDING INTERACTION BETWEEN A BROADCAST AUTOMATION SYSTEM AND A SYSTEM FOR GENERATING AUDIENCE INTERACTION WITH RADIO PROGRAMMING

(75) Inventors: Daniel Anstandig, Bay Village, OH (US); Brian Seeders, Westlake, OH (US); Craig Helmut Bowman, Durand, MI (US)

(73) Assignee: FUTURI MEDIA, LLC, Cleveland, OH (US)

(*) Notice: Subject to any disclaimer, the term of this patent is extended or adjusted under 35 U.S.C. 154(b) by 0 days.

(21) Appl. No.: 13/409,764

(22) Filed: Mar. 1, 2012

(65) Prior Publication Data

US 2013/0046825 A1    Feb. 21, 2013

Related U.S. Application Data

(60) Provisional application No. 61/575,075, filed on Aug. 15, 2011.

(51) Int. Cl.
| | |
|---|---|
| *G06F 15/16* | (2006.01) |
| *H04H 60/33* | (2008.01) |
| *H04N 21/262* | (2011.01) |
| *H04N 21/81* | (2011.01) |
| *H04N 21/8543* | (2011.01) |
| *H04H 20/38* | (2008.01) |
| *H04H 60/06* | (2008.01) |
| *H04H 60/82* | (2008.01) |

(52) U.S. Cl.
CPC ............... *H04H 60/33* (2013.01); *H04H 20/38* (2013.01); *H04H 60/06* (2013.01); *H04H 60/82* (2013.01); *H04N 21/26258* (2013.01); *H04N 21/8106* (2013.01); *H04N 21/8543* (2013.01); *H04H 2201/37* (2013.01)

(58) Field of Classification Search
None
See application file for complete search history.

(56) References Cited

U.S. PATENT DOCUMENTS

| | | | |
|---|---|---|---|
| 7,076,202 | B1 | 7/2006 | Billmaier |
| 7,698,723 | B2 | 4/2010 | Hicks, III et al. |
| 8,392,206 | B2 | 3/2013 | Parekh et al. |
| 2006/0184977 | A1* | 8/2006 | Mueller et al. ............... 725/86 |
| 2006/0288074 | A1 | 12/2006 | Rosenberg |
| 2008/0146342 | A1 | 6/2008 | Harvey et al. |
| 2009/0063511 | A1* | 3/2009 | Myers et al. ............... 707/10 |
| 2009/0157731 | A1* | 6/2009 | Zigler et al. ............... 707/102 |

(Continued)

OTHER PUBLICATIONS

International Search Report and Written Opinion of the International Searching Authority; International application No. PCT/US12/39095; International filed May 23, 2012; Applicant: Listener Driven Radio LLC.

(Continued)

*Primary Examiner* — Kaveh Abrishamkar
*Assistant Examiner* — Adrian Stoica
(74) *Attorney, Agent, or Firm* — Hudak, Shunk & Farine Co. LPA (57) ABSTRACT

A software system is provided which links a broadcast station operating system or playback system via the internet to an external data source, such as a separate audience participation system for providing audience interaction with broadcast programming, and specifically radio programming to allow the automation system of the broadcast system operating system to play externally chosen; such as by audience participation, selections automatically and in real time.

22 Claims, 2 Drawing Sheets

(56) References Cited

U.S. PATENT DOCUMENTS

2009/0187936 A1 7/2009 Parekh et al.
2011/0067044 A1 3/2011 Albo

OTHER PUBLICATIONS

European Search Report dated Feb. 26, 2015.
Singapore Search Report dated May 5, 2015.

* cited by examiner

Before:
```
12:22:39, , ,       ,"LDR VOTE OPTIONS START ",,  :00,, ,,
12:22:39,,201,D08508,"Livin' On A Prayer","Bon Jovi            ", 3:50,40,, ,
12:26:29,,203,DA0523,"Dazzey Dukes       ","Duice               ", 2:22,00,,C,
12:28:51,,203,D05093,"Whoomp! (There It ","Tag Team            ", 3:39,00,,F,
12:32:30, , ,       ,"LDR VOTE OPTIONS END   ",,  :00,, ,,
```

FIGURE 2(a)

After:
```
12:22:39, , ,       ,"LDR VOTE OPTIONS START ",,  :00,, ,,
12:22:39,,LDR,DA1201,"Livin' On A Prayer","UPick Winner         ", 3:50,40,,
12:32:30, , ,       ,"LDR VOTE OPTIONS END   ",,  :00,, ,,
```

FIGURE 2(b)

```
<NowPlaying>
    <SS32Event>
   ,     <CatId></CatId>
        <CutId></CutId>
        <Type></Type>
        <Title></Title>
        <Artist></Artist>
        <Len></Len>
    </SS32Event>
</NowPlaying>
```

FIGURE 3

SYSTEM FOR PROVIDING INTERACTION BETWEEN A BROADCAST AUTOMATION SYSTEM AND A SYSTEM FOR GENERATING AUDIENCE INTERACTION WITH RADIO PROGRAMMING

CROSS REFERENCE

This application claims the benefit of priority under 35 U.S.C. §119 of U.S. Provisional Application Ser. No. 61/575,075, filed on Aug. 15, 2011, herein fully incorporated by reference

FIELD OF THE INVENTION

The present invention relates to a software system which links, for example via the internet, a broadcast automation system to an external data source, such as a separate audience participation system for providing audience interaction with broadcast programming, and specifically radio programming. Further the software system works with existing broadcast automation systems and existing audience participation systems to influence the selection of broadcast content with the option of providing real-time selection of broadcast content or to provide content to be scheduled at a later time. The invention interfaces directly with a broadcast station's studio operating system (including a music scheduler, a file system and an automation system), to manipulate the on-air content schedule and deliver audio files for chosen selections for on-air play based on a surrogate or placeholder placed in a given file location in a playlist generated by the broadcast station's selection scheduling software.

BACKGROUND OF THE INVENTION

The nature of the broadcast radio competitive landscape has changed significantly over the past decade. New various electronic devices, such as mp3 players, have provided a greater number of options for music and spoken word consumers to enjoy audio content. Whereas 50 years ago, over the airwaves radio was the primary source of audio entertainment and a "radio" was the only means of listening to radio broadcasts, a multitude of receiver options are presently available to audio listeners. Moreover, CD and MP3 players, as well as the Internet, have given listeners the ability to choose audio content for themselves, leaving broadcast radio working hard to attract and maintain its audience.

In the past, broadcast radio has instituted methods to allow an audience to participate in content selection, including call-lines and listener surveys. These have helped some radio stations develop or maintain listener loyalty and to maintain market share. However, they have always required a "curator," such as a Disc Jockey or Program Director to adjust the radio station's programming using the information collected from the surveys and "phone call-ins." More recently, broadcast systems have adopted automation systems, such as "SS32", "Maestro", "AudioVault", "Nexgen", "WideOrbit", or "Station Playlist" which play selections by utilizing on-air schedules including music, spoken word, and commercials that have been generated by content scheduling software and subsequently exported by a file system to the automation system. However, these broadcast automation systems have the problem that the playlists cannot be automatically changed to provide for audience participation and require the intervention of a human operator who has to over-ride the automation system in order to make changes in the scheduling or playlist. Thus, it has been a problem that certain broadcast automation systems do not allow for the option of automatically using an external data source, such as an audience participation program, to allow the audience to participate in the choice of broadcast content.

The present invention provides a software system in which the audience's votes and participation can automatically (i.e., without the need for a person to participate) manipulate a radio station's music schedule or spoken word programming schedule by interfacing with the radio station's studio operating system including the automation system and/or programming scheduling software. In particular, this system provides a file, which is generated as a choice of a given number of selections upon which audience members were permitted to vote. A chosen selection is then routed directly by means of a placeholder or surrogate file by the invention into the radio station's playlist (which resides in the radio station's music scheduling software or radio automation system) as the next play. Selection is generally dictated by the audience participation system, which can use a variety of criteria for the selection choice. The selection can be chosen from a number of choices by meeting a criteria, such as the most number of positive votes, the least number of negative votes, or by another defined criteria, such as a geographic or demographic characteristic or even individualized preferences. The audience participation system can include means as part of the voting process to prompt members of the audience to participate in a vote by various means including broadcast alerts, texts, IM or e-mail alerts or other social media.

SUMMARY OF THE INVENTION

The present invention provides for a software link which securely uses the internet to communicate between a broadcast automation system and an external data source. The external data source is advantageously an audience participation or interaction system for broadcast programming, which gathers audience input or characteristics, including, for example, votes via an interactive interface accessible through the communication network, which includes various electronic communication methods, such as the internet, telephone and cable, and mobile devices, such as cellular, tablet/e-pads, and PDAs. The present invention uses a placeholder or surrogate file to stand in the place of the selection which is provided by the audience participation system and which is ultimately generated by the audience participation system and in response supplied from the broadcast automation system as an audio file to the broadcast automation system for on-air play.

Thus, the software system of the present invention system includes software that permits the radio station' studio automation system to interact via an external communication means such as the web, with a separate server which hosts the process of selection determination. Specifically, the software monitors a definable location for playlist information, such as new log exports, which are generated by the radio station automation system or a music scheduling program. An example of an acceptable log export is a text-based file containing data that represents the on-air schedule for a broadcast station for a given period. The file is row and comma based where each row in the file (separated by a line-feed character, carriage return character, or combination of both) represents one entry in the schedule. Each row is separated into multiple fields. These fields contain information such as: Media Type, Category, Cart Number, Scheduled Date/Time. A list of multiple selections are replaced by a placeholder selection that is used as a surrogate number/filename for the winning selection. The separate server advantageously conducts the audience interface and stores the resulting data, which are published to a web widget of the radio station to conduct the voting session. The software receives data for the broadcast station, which it uses internally, manipulates it as necessary, and forwards it to the separate server via a web-based API. The software queries the web-based API which provides XML data to convey the current winning selection from the audience participation system using HTTP GET via TCP-IP which are sent back from the separate server to the software system. The software system then copies the contents of the digital audio file of the winning selection to a new file ("placeholder" file) using a file location, which causes the radio station automation system to import the digital audio file. This results in the selection being played on-air when the placeholder file reaches the on-air position of the automation system. The system is not limited to the use of log exports to manage playlist information, and can encompass other methods of transferring information.

In a separate aspect of the invention which is termed herein an "open selection event", a series of selections can be played. In this aspect of the invention, the audience ranks selections chosen from a defined set. Again, the radio station automation system encounters a command from the separate server, which begins the radio station/software/separate server interaction session. The software queries the server web-based API which provides XML data containing information about which selection or song in the selection voting currently has the most votes. This selection will be the next play when a placeholder file is encountered in the on-air schedule, and after play, the software will notify the separate server by a web-based APL so that the separate server resets the votes on that selection and moves it into last place. The next-most voted selection then becomes the top selection, which the software will copy into the next placeholder file. This process repeats until the radio station automation system encounters a command from the separate server to end the song or selection replacement session in the on-air schedule. Then a web-based notification is sent to the separate server to de-activate the song or selection replacement session.

DETAILED DESCRIPTION OF THE INVENTION

Figure 1:
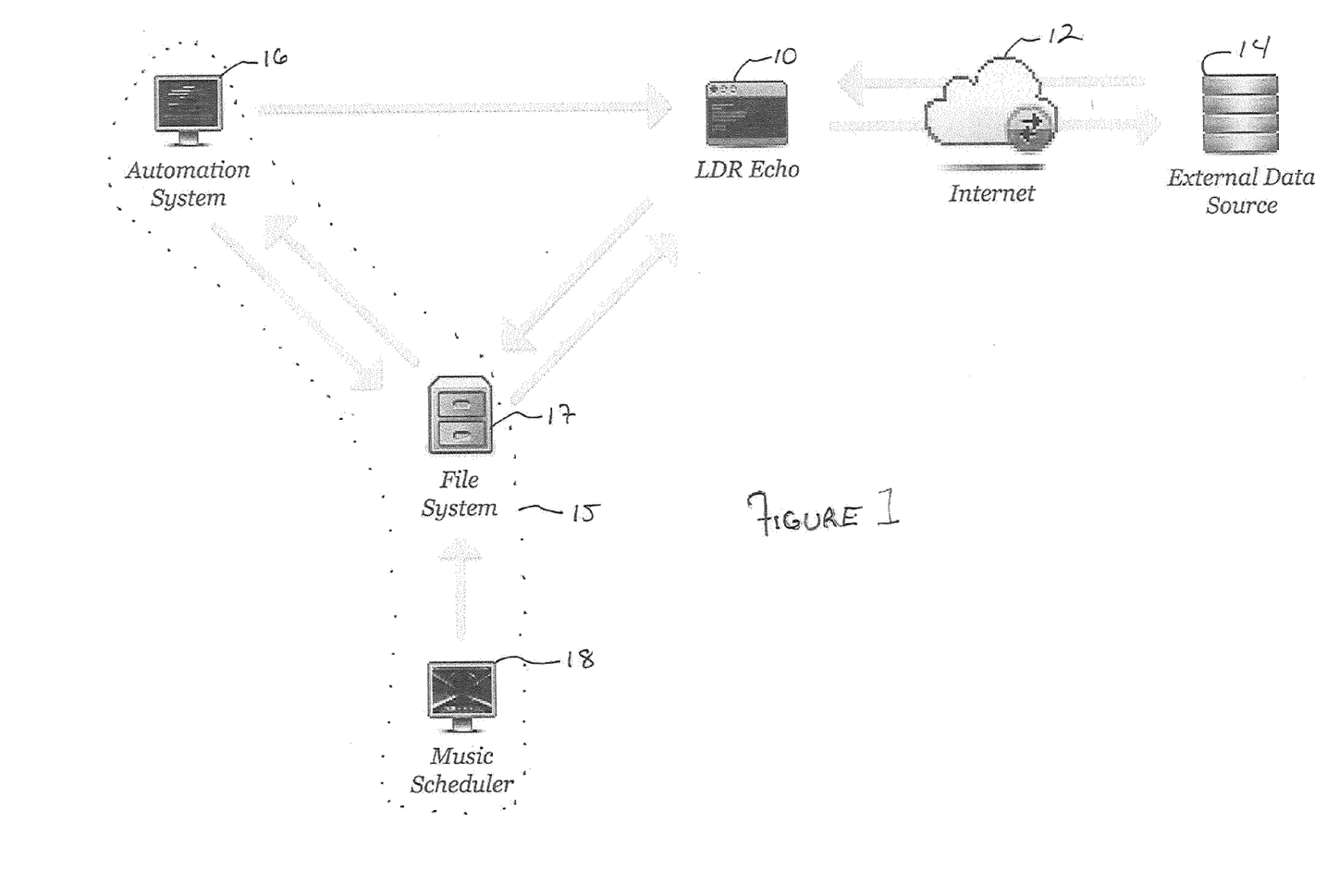
FIG. 1 is diagram of the present invention.

FIG. 1 shows a schematic view of the software system in accordance with the present invention in the context of the interaction between the external data source and specifically, the audience participation system, and the broadcast automation system. While the invention is described with respect to a separate and external audience participation system (i.e. which is implemented and managed apart from the broadcast station), it should be understood that the data source can be internal to the broadcast station and operate as part of the automation system and where the link of the present invention is used as a mechanism to import files external to the initial playlist, file system, and/or automation system.

The software system of the present invention uses a surrogate or placeholder which is an entry in a log export file (and thus an on-air schedule) that will later be replaced by another selection. The log export file is a text-based file which uses row and comma format for data that represents the on-air schedule for a broadcast station for a given period, such as a broadcast day. The schedule is generally created in a music scheduler first and then exported to a broadcast automation system. Each placeholder has a category and/or number that corresponds to a file on the file system from which the chosen selection can be played by the broadcast automation system. The invention subsequently copies the selection's file contents into this placeholder file to cause that selection to be played. In the log export file, each row in the file is separated by a line-feed character, carriage return character, or combination of both and represents one entry in the schedule. Each row is separated into multiple fields, which are separated by commas. These fields contain information such as Media Type, Category, Cart Number, and Scheduled Date/Time.

The software system, shown generally at 10, further interacts such as by way of the internet 12, with an external data source, which is specifically an audience participation system shown generally at 14. The audience participation system allows the audience to indirectly interact with the broadcast station operating system 15 which includes an automation system 16, a file system 17 and a music scheduler 18. One type of interaction that can be used to gather data to modify an on-air schedule is a voting session in which a group of songs are provided by the broadcast station, placed in the on-air schedule, and read by the audience participation system to enable it to create a voting session which can be viewed and voted upon by the audience using a web-based application. The voting session is conducted by the audience participation system 14 for a given period, and when it ends, the votes are tallied and the winning selection can be supplied by the software system 10 using the internet 12 to the broadcast station operating system 15 to be played on the air.

Another type of audience interaction is an open selection event which gives the audience the ability to vote upon a larger number of selections and to rank the selections. The selections are supplied to the broadcast automation system in an order, such as by popularity, and played on-air according to that order. After a selection has been played, it is moved to the end of the list and the next selection is played in the next available placeholder spot. This type of interaction can continue for a selected amount of time, i.e. while the interaction between the broadcast station automation system and the audience participation system remains linked or "open" by the software system of the present invention so that a number of selections are supplied during an open selection event.

The audience participation system uses a software program, to gather the "Now Playing" or "Currently Playing" selection data which includes the title, artist and other information representing the selection that is currently playing on-air on the broadcast station. The broadcast automation system generally sends the "now Playing" data in a single format, but the software of the present invention has the ability to forward this information in a variety of different formats to multiple sources using a variety of protocols, such as XML over TCP/IP. The audience participation system uses various commands or entries into the on-air-schedule to determine when certain events will happen, including the start of a given voting session which exists in a 0-second audio file, vote option start and end commands that combine to denote a list of selections that are available in a voting session, and for open selection event, the begin selection replacement and end selection replacement commands that begin and end the open selection event.

Figure 2A:
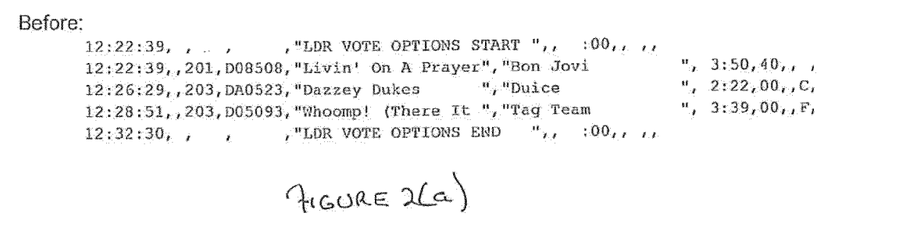
FIG. 2(a) is a representation of a Selector selection log which is generated by a broadcast automation system.
Figure 2B:
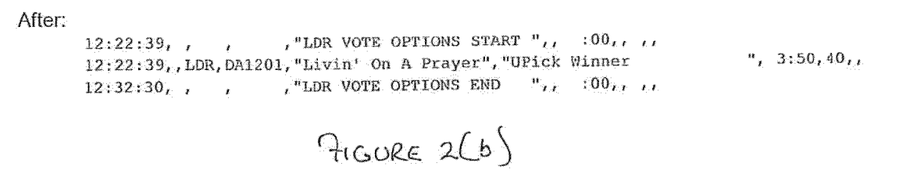
FIG. 2(b) is a representation of a Selector selection log after it has been parsed by an audience participation system.

The linking software uses a placeholder or surrogate in a log export file to allow the external data source to communicate with the station broadcast automation system. The placeholder is an entry in the log export file (and thus in the on-air schedule) that will later be replaced by a selection. This event is illustrated in FIGS. 2(a) and 2(b). Each placeholder has a category and/or number that corresponds to a file on the file system from which the chosen selection can be played by the automation system. The linking software of the present invention copies an audio file content from the broadcast station file system into the placeholder file to make that audio file play.

The audience can use the audience interaction user interface or "widget" to view a list of selections made available by the broadcaster and can vote to play those selections at a later point or "on-the-air" as directed by the broadcaster. The broadcaster is given the option for incorporating audience interaction through a playlist management system which includes controls for the playlist module, controls to activate various settings related to feeding the radio station studio operating system, a screen to add a selection to the playlist, to start a voting session by adding a "pick next" voting session, to view live voting session results by managing and viewing "pick next" voting sessions, and to generate voting result reports.

The software linking system 10 of the present invention includes four major components, each responsible for a separate process, that can be combined together to create the functionality required to enable the broadcast station automation system to play a selection chosen through a voting session or an open selection event.

The first component is a log parsing component which monitors a definable location (directory) for new log exports generated by the broadcast station selection scheduling program. That schedule is forwarded to the external data source, i.e. the audience participation system 10, and modified such that the multiple selections which will be included in a voting session are replaced with a place holder which will later be used as a surrogate number/filename for the winning selection. The voting sessions for each day are stored in a database on the audience participation server and are published to the station's web widget for public voting. FIGS. 2(a) and (b) illustrates an example of a voting session before and after the log parsing taken from a Selector music log intended for an automation manufactured by Scott Studios/dMark/Google/Wide Orbit as defined by these automation manufacturers. Other automation system manufacturer's music import format is likewise supported by the present invention.

Figure 3:
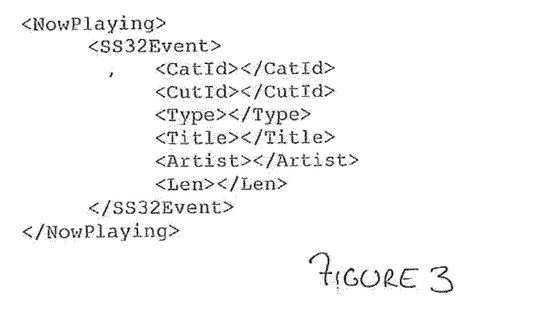
FIG. 3 is a representation of a format of XML generated by the broadcast automation system which is received and re-formatted by the software system of the present invention and which are sent to the audience participation system by means of HTTP POST via a web-based API.

As a second component, the linking system receives Now Playing data from the broadcast station automation system 16, uses this information internally, and forwards this information to the audience participation system via a web-based API. The information is formatted, for example in XML, and transferred via a TCP/IP connection as a stream of bytes. The format for XML coming from the broadcast station automation system is illustrated in FIG. 3. The software linking system re-formats this now playing data, and sends it to the audience participation system via HTTP POST via a web-based API. The data is sent along with authorization credentials (username and password) for security. The HTTP POST parameters used by this API are:

stationId
   A string of characters that identifies the station to the audience participation system
auth_username
   A string of characters representing the username used for authentication
auth_password
   A string of characters representing the password user for authentication
selectionID
   A string of characters that contains the category and cart number of the selection from the broadcast station automation system. These two pieces of data combined identify the selection in the automation system. These two pieces of information are combined into one string and separated by a forward-slash ("/"). The category comes first, followed by the cart number.
Example: S01/0865
artistName
   A string of characters identifying the artist of the selection that is playing
selectionName
   A string of characters identifying the title of the selection that is playing
timestamp
   A string of characters representing the date and time in the automation system at the time at which the selection was played.
   The string is in the format of YYYY-MM-DD: HH:II:SS
YYYY is year in 4-digit format, "2011
MM is month in 2-digit format, "01" or "12"
DD is day in 2-digit format, "01" or "31"
HH is hour in 24-hour format, "01"-"23"
II is minute in 2-digit format, "01"-"59"
SS is second in 2-digit format: "01"-"59"
length
   An integer representing the number of seconds for which the selection will be playing The third component implements the ability of the software link 10 of the present invention to use a voting session. In this component, using HTTP GET via TCP-IP, the link queries the audience participation system web-based API which provides XML data to convey the current "winner" of the voting session. Details about the HTTP request and the XML are then sent back from audience participation system. Once the winner has been received by the software link, the digital file of the winning selection is copied to a new file ("placeholder" file) using a specific filename and saved to a specific location, which will cause the broadcast station automation system to import it, causing the winning selection to be played when the placeholder (from Component 1,) reaches the on-air position of the automation system.

As an example:
\\automation_machine\share\audio_directory\winning_song.wav
would be copied to:
\\automation_machine\share\audio_directory\import_location\placeholder_song.wav The fourth component implements the open selection event feature of the present invention. To begin an open selection event, the station broadcast automation system encounters an audience participation system command in the on-air schedule called "Begin Song Replacement". This command is sent to the audience participation system, via its web-based API, and it will begin publishing open selection event data to its API. Using HTTP GET via TCP-IP, the software link system 10 queries the audience participation 14 web-based API which provides XML data containing information about which selection in open selection event currently has the most votes. This is the next selection that should play on the air during the open selection event. When the most-voted selection changes, the software system 10 of the present invention will copy the contents of the digital audio file which contains that selection into the next placeholder file scheduled to play in the automation system 16. It should be understood that the system could also supply a video file or an audio and video file for broadcast media other than radio and also that song is used herein as an example of a type of selection (along with spoken word or video selections, for example) that could be supplied. When the automation system encounters the placeholder file in the on-air schedule, the current most-voted selection plays on the air. When it plays, the software link sends a notification to the audience participation system 14 via the web-based API, and the audience participation system 14 resets the votes on this selection, putting it in last place. The next most-voted selection becomes the top selection, which the software link will begin copying into the next placeholder file. This process repeats until the automation system encounters the audience command "End Selection Replacement" in the on-air schedule. When the automation system 14 encounters the audience participation command "End Selection Replacement" in the on-air schedule, a notification is sent to the audience participation system 14 via the web-based API, and the audience participation system 14 de-activates the open selection event.

The following section outlines, from start to finish, the process by which each interaction, and subsequent schedule modification, is executed. Numbers in parentheses refer to diagram shown in FIG. 1 which shows flow of data through the system.

Voting Sessions

Broadcast Station personnel creates an on-air schedule for a given day using music scheduling software. Commands for the audience participation system are contained within this schedule.

The schedule is exported to a text file on the file system 17.

The software link system 10 of the present invention, while monitoring for new log export files, discovers the new export file and reads it from the file system 17.

The software link system sends the log export file to the audience participation system 14 API via the HTTP interface. The connection is left open so that the audience participation system 14 server can send information back.

The audience participation system 14 server reads the audience participation system 14 commands from the export file, and replaces the necessary commands with placeholder selections, which the software link will later change.

The audience participation system 14 server sends the updated export file (with new placeholders) back to the software link system 10 application through the still-open HTTP connection, then closes the connection.

The software link system 10 application sends the new export file back to the file system 17 so that the automation system 16 can export it.

The broadcast automation system 16, while monitoring for new export files, discovers the new export file and reads it from the file system 17, importing the schedule contained within.

The broadcast automation system 16 plays music and other schedule entries as normal, until it reaches the audience participation system 14 command entry UPickStart, which signifies the beginning of a voting session.

The UPickStart command "plays" in the automation system 16, as if it were music, for zero seconds.

The Now Playing event data for the UPickStart command is sent to the broadcast station automation system 16 application.

The broadcast automation system 16 application sends this event data to the software link system 10 in XML format.

The software link system 10 forwards this information to the audience participation system 14 API via the HTTP interface.

The audience participation system 14 server activates the voting session associated with the UPickStart command and begins publishing the live results of the voting session to the API.

The software link system 10 application begins making periodic requests for up-to-date voting session information at a set interval to the audience participation system 14 API via the HTTP interface.

After each request for new information, if the winning selection (i.e., the selection with the most votes) has changed since the last request, or if this is the first request, the software link system 10 will send a command to the file system 17 to copy the digital audio file containing the winning selection into a new file corresponding to the placeholder entry in the on-air schedule. This file is in a special "inbox" directory, a directory from which the file will be read and refreshed by the broadcast station automation system 16, prior to playing on the air.

The broadcast station automation system 16, while monitoring the file system 17, discovers the new audio file for the placeholder entry and loads the data in the file, including metadata such as selection title and artist. The audio file is then queued to play when the automation system 16 encounters the placeholder on-air schedule entry.

When the broadcast station automation system 16 encounters the placeholder on-air schedule entry for the currently active voting session, the most recently queued (from Step 17) audio file for this entry is played.

The automation system 16 sends this Now Playing event to an automation system 16.

The automation system 16 sends this Now Playing event, in XML format, to the software link system 10 application.

The software link system 10 application recognizes this now playing event as the winning selection for the voting session, and stops making audience participation API requests for voting session information.

The software link system 10 application sends the winning song information to the audience participation system 14 API via the HTTP interface.

The audience participation system 14 server recognizes that the winning selection has played, and de-activates the voting session.

Steps 9-23 repeat for each voting session in each on-air schedule.

After the station has scheduled its daily music log and it has been processed by component 1 of the software link system, a specific file is played by the stations automation system 16 and is sent (via Component 2) to the audience participation system 14 server triggering a voting session on the stations website. Once this command is received the selections which were scheduled for voting are placed in a custom widget which is embedded into the broadcast stations website. Listeners can vote on the selection they want to play next and those votes are tabulated by audience participation system. The software link system 10 checks into the audience participation system 14 server for the winning selection and as each new winner is determined the winning selection is processed by component 3. Once the winning selection is determined to have played (via component 2) the voting session on the website is closed.

Open Selection Event

Radio Station personnel creates an on-air schedule for a given day using music scheduling software of the music scheduler 18. Audience participation system 14 commands are contained within this schedule.

The schedule is exported to a text file on the file system 17.

The software link system 10, while monitoring for new log export files, discovers the new export file and reads it from the file system 17.

The software link system 10 sends the log export file to an audience participation system 14 API via the HTTP interface. The connection is left open so that the audience participation system 14 server can send information back.

The audience participation system 14 server reads the audience participation system 14 commands from the export file, and replaces the necessary commands with placeholder songs, which the software link will later change.

The audience participation system 14 server sends the updated export file (with new placeholders) back to the software link system 10 application through the still-open HTTP connection, then closes the connection.

The software application system 10 sends the new export file back to the file system 17 so that the broadcast station automation system 16 can export it.

The broadcast automation system 16, while monitoring for new export files, discovers the new export file and reads it from the file system 17, importing the schedule contained within.

The broadcast automation system 16 plays music and other schedule entries as normal, until it reaches the audience participation system 14 command entry Begin Song Replacement, which signifies the beginning of an open selection event.

The Begin Song Replacement command "plays" in the automation system 16, as if it were music, for zero seconds.

The Now Playing event data for the Begin Song Replacement command is sent to the broadcast station automation 16 application.

The broadcast station automation 16 application sends this event data to the software link system in XML format.

The software link system 10 forwards this information to the audience participation system 14 API via the HTTP interface.

The audience participation system 14 server activates an open selection event and begins publishing the live results of voting to the API.

The software system 10 application begins making periodic requests for up-to-date voting information at a set interval to the audience participation system 14 API via the HTTP interface.

After each request for new information, if the winning selection (e.g., the selection with the most votes or the selection with the least losing votes) has changed since the last request, or if this is the first request, the software link system 10 will send a command to the file system 17 to copy the digital audio file containing the winning selection into a new file corresponding to the placeholder entry in the on-air schedule. This file is in a special "inbox" directory, a directory from which the file will be read and refreshed by the automation system 16, prior to playing on the air.

The broadcast station automation system 16, while monitoring the file system, discovers the new audio file for the placeholder entry and loads the data in the file, including metadata such as song title and artist. The audio file is then queued to play when the automation system 16 encounters the placeholder on-air schedule entry.

When the broadcast station automation system 16 encounters the next placeholder on-air schedule entry, the most recently queued (from Step 17) audio file for this entry is played.

The broadcast automation system 16 sends this Now Playing event to the automation system 16.

The automation system sends this Now Playing event, in XML format, to the software link system 10 application.

The software link system 10 application sends the selection information to the audience participation system 14 API via the HTTP interface.

The audience participation system 16 server recognizes that the selection has played, and resets the votes for this selection, so that a new selection is published via the API.

Steps 9-22 repeat for each open selection event placeholder in each on-air schedule, until the End Song Replacement command on-air schedule entry is encountered.

The End Song Replacement command "plays" in the automation system 16, as if it were music, for zero seconds.

The Now Playing event data for the End Song Replacement command is sent to the automation system 16 application.

The automation system 16 application sends this event data to the software link system 10 in XML format (1)

The software link system 10 recognizes that an open selection event is now turned off, and stops making requests to the audience participation system 14 API for new selection information.

The software link system 10 forwards this information to the audience participation system 14 API via the HTTP interface (2).

The audience participation system 14 server de-activates the open selection event.

While in accordance with the patent statutes the best mode and preferred embodiment have been set forth, the scope of the invention is not limited thereto, but rather by the scope of the attached claims.

What is claimed is:

1. A system for use with a broadcast station having a broadcast station operating system, the broadcast station operating system operating with a pre-existing broadcast station play schedule having a file at a file location and with web-based external data sources of an audience comprising a plurality of users, the system comprising:

a hardware and a software link which together form an external link which interfaces securely with the pre-existing broadcast station operating system, and with the web-based external data sources to determine a single selection from a plurality of selections, which single selection is chosen based upon an event which includes a tabulation of inputs through the web-based external data sources and from the plurality of users, wherein the external link determines the existence of the file and places a placeholder at the file location in the broadcast station play schedule, monitors the file at a definable location generated by the broadcast station operating system, receives data from the broadcast system operating system as to when to start the event in the pre-existing broadcast station play schedule, and uses that data to create an interaction session between the broadcast station operating system, the web-based external data sources, and the external link to query the audience by means of a voting session which can be viewed and voted upon by the audience using a web-based application, to tabulate and store the resulting data and to thereby determine a selection based upon the interaction session, and then securely uses the Internet to export the selection determined by the software link based upon the interaction session into the position of the placeholder to cause the broadcast station operating system to play the selection on-air.

2. A system as set forth in claim 1 wherein the broadcast station is a radio station and the web-based external data sources communicate with the broadcast radio station by means of the Internet.

3. A software system as set forth in claim 2 wherein the event comprises a voting session or an open selection event.

4. A system as set forth in claim 1 which allows the event to determine a next selection in real-time.

5. A system as set forth in claim 1 wherein the external data sources comprise an audience input system and the file location of the broadcast station play schedule comprises a plurality of audio files corresponding to a plurality of selections and a definable location for new log exports and the software link forwards the broadcast station play schedule to the audience input system which places a placeholder in the definable location and substitutes an audio file for the placeholder corresponding to a selection determined by the software link from the plurality of selections based on the input from the external data sources from the plurality of users.

6. A system as set forth in claim 5 wherein the audience input system uses a voting session or an open selection event to determine a selection to replace the placeholder.

7. A system as set forth in claim 5 wherein the audience input system uses a voting session to rank a group of selections to determine an order to replace a group of placeholders with selections in the pre-existing broadcast station play schedule.

8. A system as set forth in claim 1 wherein the interaction session is an open selection event during which the link remains open between the broadcast operating system and the external data sources.

9. A system as set forth in claim 2 wherein the interaction session is an open selection event during which the link remains open between the broadcast operating system and the external data sources for a selected amount of time defined from a start to an end command supplied by the external link.

10. A method of linking a broadcast station automation system through an external link with an external data source using the Internet, which provides real-time audience input from an audience comprising a plurality of users to a broadcast station automation system of programming that determines a pre-existing broadcast play schedule having a file at a file location comprising:

providing an external server that securely interfaces between the broadcast station automation system of programming and a plurality of web-based external data sources;

determining the existence of the file and the file location and placing a placeholder in the pre-existing broadcast play schedule at the file location, and further monitors the file;

using the external link to receive data from the broadcast station automation system of programming and thereby to create an interaction session between the broadcast station automation system of programming, the web-based external data sources and the external link to start an event in the pre-existing broadcast play schedule by which the plurality of users vote on a plurality of selections and securely use the web-based external data sources to register their vote;

tabulating the votes by means of the external link to determine a winning selection from the plurality of selections; and the external link substituting the winning selection for the placeholder in the pre-existing broadcast play schedule whereby the audience can participate in the determination of the winning selection to be played in the pre-existing broadcast play schedule.

11. A method of linking a broadcast station automation system and an external data source using the Internet as set forth in claim 10 wherein the broadcast station is a radio station.

12. A method of linking a broadcast station automation system and an external data source using the Internet as set forth in claim 10 wherein the audience input comprises a voting session or an open selection event.

13. A method of linking a broadcast station automation system and an external data source using the Internet as set forth in claim 10 which allows the audience input to determine a next selection in real-time.

14. A method of linking a broadcast station automation system and an external data source using the Internet as set forth in claim 13 wherein the external data source communicates with the broadcast station automation system by means of the Internet.

15. A method of linking a broadcast station automation system and an external data source using the Internet as set forth in claim 14 wherein the external data sources comprise an audience input system and the file location of the broadcast station play schedule includes a definable location for new log exports and the software link forwards the play schedule to the audience input system which places a placeholder in the definable location.

16. A method of linking a broadcast station automation system and an external data source using the Internet as set forth in claim 15 wherein the audience input system uses a voting session for an open selection event to determine a selection to replace the placeholder.

17. A method of linking a broadcast station automation system and an external data source using the Internet as set forth in claim 16 wherein the software system communicates with the audience input system via the Internet.

18. A method of providing real-time input by means of an external link from a plurality of web-based external sources to a broadcast radio station automation system including an internal server having a plurality of files and the automation system executing a pre-existing broadcast station play schedule having a pre-programmed playlist having a file at a definable file location comprising:

providing a server that securely interfaces using the Internet between the broadcast automation system and the web-based external data sources;

using the external link to determine the existence of the file, and the file location and to place a placeholder in the pre-programmed playlist at the file location and to further monitor the file;

using the external link to receive data from the broadcast radio station automation system and thereby to create an interaction session between the broadcast radio station automation system, the web-based external data sources and the external link, and to start an event in the pre-existing broadcast play schedule by which the plurality of users vote on a plurality of selections and securely use the web-based external data sources to define a real-time event that triggers the determination of a selection from the plurality of selections;

using the external link to substitute the selection for the placeholder in the pre-programmed playlist whereby a real-time event determines the broadcast of a selection in a pre-programmed broadcast playlist.

19. A method of providing real-time input from an external source to a broadcast station automation radio system as set forth in claim 18 wherein the real-time event comprises a voting session or an open selection event.

20. A method of providing real-time input from an external source to a broadcast station radio automation system as set forth in claim 19 wherein the external data source is an audience input system and the broadcast radio station automation system includes audio files corresponding to a plurality of selections and a definable location for new log exports, and the software link forwards a play schedule to the audience input system which places a placeholder in the definable location and determines which of the audio files of the plurality of selections to play whereby the radio station automation system substitutes that audio file for the placeholder.

21. A hardware and software system which forms an external link which interfaces with a broadcast station operating system of a broadcast station and an external data source providing real-time input from a plurality of users using web-based external data sources to the broadcast station operating system, the broadcast station operating system including an internal server having a pre-programmed playlist including a file at a file location, the system comprising:

an external server that securely interfaces using the Internet between the broadcast station operating system and the web-based external data sources and includes the external link to determine the existence of the file and the file location and to place a placeholder in the pre-programmed playlist at the file location and to monitor the file and to receive data from the broadcast station operating system and thereby to create an interaction session between the broadcast station operating system, the web-based external data sources, and the external link, and to start a real-time event by which the plurality of users vote on a plurality of selections and securely use the web-based external data sources to define the real-time event that triggers the determination of a selection from the plurality of selections; and the external link substituting the selection from a plurality of selections whereby the external system triggers the broadcast operating system to substitute the selection for the placeholder in the pre-programmed playlist and whereby a real-time event determines the broadcast of a selection in a pre-programmed broadcast playlist.

22. A hardware and software link which forms an external link which interfaces with a broadcast station operating system of a broadcast station and web-based external data sources of a plurality of users comprising a broadcast radio audience, to improve a play schedule by:

the broadcast station operating system operating with a pre-existing broadcast station play schedule having a file at a definable location, and wherein the hardware and software link creates an interaction session between the broadcast station operating system, the web-based external data sources, and the external link, and the external link securely interfacing with a plurality of web-based external data sources through the interaction session to determine a winning selection from a plurality of selections which is chosen based upon an event which includes a tabulation of inputs by the external link and received through the web-based external data sources, wherein the hardware and software link has a first component which monitors the definable location in the broadcast station play schedule and which is generated by the broadcast station operating system and the software link places a placeholder at the definable location, a second component which receives data from the broadcast station operating system, a third component which implements the ability of the software link to use a web-based voting session, and a fourth component which monitors the definable location and defines an open selection event to query an audience comprising a plurality of users and then to determine the winning selection and to export the selection to replace the placeholder in the definable location in the broadcast station play schedule to cause the broadcast station operating system to play the winning selection on-air.

\* \* \* \* \*